United States Patent [19]

Coulson

[11] 3,723,500
[45] Mar. 27, 1973

[54] BIS(2,3-DIMETHYLENEBUTYL)-CYANOMETHANE COMPOUNDS AND THEIR PREPARATION

[75] Inventor: Dale Robert Coulson, Wilmington, Del.

[73] Assignee: E. I. du Pont de Nemours and Company, Wilmington, Del.

[22] Filed: Sept. 21, 1970

[21] Appl. No.: 74,195

[52] U.S. Cl..................................260/465.8 R, 260/33.6 UA, 260/78.4 R 260/78.4 N, 260/82.3, 260/88.7, 260/465 D, 260/465 H, 260/465 K, 260/465.4, 260/465.9, 260/483, 260/485 R, 260/486 R, 260/561 N, 260/465.3, 260/593 R, 260/644, 260/607 A, 260/607 B

[51] Int. Cl..........................................C07c 121/30
[58] Field of Search.........260/465.4, 465.8 R, 465.3, 260/465.9

[56] References Cited

UNITED STATES PATENTS

| | | | |
|---|---|---|---|
| 2,912,417 | 11/1959 | Drysdale | 260/465.4 X |
| 2,964,505 | 12/1960 | Drysdale | 260/465.4 X |
| 2,971,024 | 2/1961 | Zaugg et al. | 260/465.4 X |
| 3,574,717 | 4/1971 | Lloyd | 260/465.3 X |

*Primary Examiner*—Joseph P. Brust
*Attorney*—James H. Ryan

[57] ABSTRACT

Novel polymer-forming mono- and bis(2,3-dimethylene-butyl)-bis(negatively substituted)methanes (e.g., bis(2,3-dimethylenebutyl)malononitrile) are prepared from allene and corresponding negatively substituted (activated) methanes (e.g., malononitrile in the presence of a palladium (O) or rhodium (I) catalyst.

6 Claims, No Drawings

BIS(2,3-DIMETHYLENEBUTYL)-CYANOMETHANE COMPOUNDS AND THEIR PREPARATION

BACKGROUND OF THE INVENTION

1. Field of the Invention

This invention relates to a class of negatively disubstituted 1,3-dienes, i.e., mono- and bis(2,3-dimethylenebutyl)-bis(negatively substituted)methanes, their polymers and their preparation of reaction of allene with certain negatively disubstituted methanes in the presence of palladium (O) and rhodium (I) catalysts.

2. Prior Art

The reaction of allene and a negatively disubstituted methane to produce a corresponding negatively disubstituted 2,3-dimethylenebutyl compound was unknown prior to this invention. A related reation of allene and acetic acid in the presence of palladium chloride to form 3-methyl-2-hydroxy-methylbuta-1,3-diene acetate (alternatively named 2,3-dimethylene-butyl acetate) has been disclosed [Shier, J. Orgmet. Chem. 10, P15 (1967); Netherlands 68.03601].

SUMMARY OF THE INVENTION

The monomers of the invention can be represented by the formula:

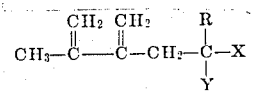

wherein R is hydrogen, lower alkyl (of up to eight carbons) or 1,3-dimethylenebutyl, and X and Y are each cyano (—CN), hydrocarbylcarbonyl (—COR'), hydrocarbyloxycarbonyl (—COOR'), nitro (—NO$_2$), N,N-dihydrocarbylamido (—CONR$_2$'), hydrocarbylsulfinyl (—SOR') or hydrocarbylsulfonyl (—SO$_2$R'), the hydrocarbyl group R' being defined as lower alkyl (of up to eight carbons) or aryl of six to 10 carbon atoms, with the proviso that R is only hydrogen or lower alkyl when X is —COOR' and Y is —CN or —COOR'. The preferred monomers are those of the above formula wherein X and Y are each cyano, lower alkyl-carbonyl or lower alkoxycarbonyl. In the preferred monomers, the term "lower alkyl" R' is meant to include linear or branched saturated aliphatic hydrocarbon radicals containing up to eight carbon atoms. Representative lower alkyl R' groups are methyl, ethyl, n-propyl, isopropyl, n-butyl, isobutyl, t-butyl, amyl, neopentyl, hexyl, 2-ethylhexyl, heptyl and octyl.

The polymers of the invention are homopolymers and copolymers of the above-defined monomers. The polymers are prepared by vinyl-type polymerization, and the comonomers included as moieties in the copolymers are vinyl monomers. Preferred comonomers are isoprene and styrene.

The process of the invention is the preparation of the above-defined monomers by reaction of allene and corresponding negatively disubstituted (activated) methanes in the presence of rhodium(I) or palladium(O) catalysts. Preferred catalysts are bis(triphenylphosphine) (maleic anhydride)palladium(O) and tris(triphenylphosphine)chlororhodium(I).

DETAILS OF THE INVENTION

The process of preparing the negatively disubstituted 2,3-dimethylenebutane monomers of this invention from allene and corresponding activated methanes can be described basically by the following reaction scheme:

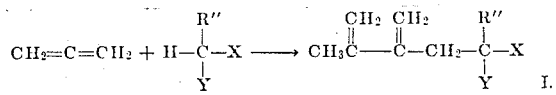

R" being hydrogen or lower alkyl (as above) and X and Y, also as above. When R" in the activated methane is hydrogen, the equation can be written:

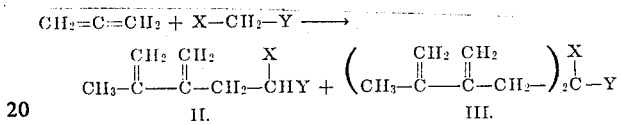

Products of formulas I and II can be prepared essentially without restriction from negatively disubstituted methanes,

wherein R", X and Y are as previously defined. Products of formula III also are believed to be preparable from all activated methanes, X—CH$_2$—Y, both 1,3-dimethylenebutyl groups deriving from the allene reactant. However, in instances involving preferred activated methanes wherein X is lower alkoxycarbonyl (specifically ethoxycarbonyl) and Y is cyano or lower alkoxycarbonyl (specifically ethoxy-carbonyl), products of formula III have not been successfully isolated.

It will be noted that a general formula of the monomers of the invention corresponding to formulas II and III can be written alternatively as:

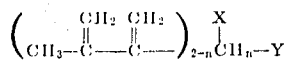

where X and Y are as noted above and $n$ is 0 or 1, being only 1 when X is —COOR' and y is —CN or —COOR'.

The process is conducted by contacting the reactants at temperatures in the range of about 50° to about 150° C., preferably at about 100°–120° C. The temperature is normally selected to give essentially complete reaction within about 6 hours. Neither the temperature nor time of reaction is critical but reaction times should not be prolonged when reaction temperatures are near 150° C. because the presence of undesirable decomposition products has been noticed under such conditions.

Pressure is likewise not critical and can be of any value from ordinary atmospheric to any desired higher pressure. Autogenous pressures developed in process operations illustrated in Examples 1–8 were commonly in the range of about 45 to 70 atmospheres. Excessive pressure, i.e., above about 200 atmospheres, is not considered to provide any advantage.

The allene:coreactant (activated methane) molar ratio in the process is not critical. However, the reactant ratio has an influence on the proportion of products of formulas I and II obtained in the process. Compounds of formula I are favored when the allene:coreactant molar ratio is less than 2:1, preferably about 1:1, and compounds of formula II are formed when the ratio is about equal to or greater than 2:1, preferably in the range of 2:1 to 2.5:1. When the formation of a compound of formula II is difficult, i.e., when the activated methane reactant is a malonic or cyanoacetic ester, an allene: coreactant molar ratio of about 2:1 is optimum.

The process requires the presence of a Rh(I) or Pd(O) catalyst. Palladium(O) (O) complexes such as bis(triphenylphos-phine) (maleic ahydride)palladium and bis(triphenylphosphine) (fumaronitrile)palladium are effective catalysts. Tris(triphenylphosphine)chlororhodium is representative of effective Rh(I) catalysts. The Pd(O) or Rh(I) catalyst may, in fact, contain any ligands which stabilize the respective valence states. These ligands include phosphines, arsines, or isocyanides containing alkyl or aryl substituents in all combinations. Also, olefins containing electronegative substituents such as CN, $CO_2R'$, $NO_2$, aryl and $OR'$ are acceptable ligands. In addition, special ligands such as carbon monoxide or phosphorus trifluoride may be used. The catalysts may also be formed in situ from an appropriate Pd(II) or Rh(III) complex and a reducing agent such as sodium borohydride, lithium aluminum hydride or hydrazine. It will be appreciated that more than one Pd(O) and/or Rh(I) catalyst may be used simultaneously, but to no particular end.

Some representative catalysts useful in the process are tabulated as follows:

TABLE I

| NAME | REFERENCE |
|---|---|
| 1. Tetrakis(triphenylphosphine)palladium(O) | L. Malatesta, et al., J. Chem. Soc., 1957, 1186 |
| 2. Bis(triphenylphosphine)-(maleic anhydride)-palladium(O) | S. Takahashi, et al., Nippon Kagaku.Zasshi, 88, 1306 (1967) |
| 3. Bis(triphenylphosphine)-(dimethyl fumarate)-palladium(O) | do |
| 4. Bis(triphenylphosphine)-(dimethyl maleate)-palladium(O) | do |
| 5. Bis[1,2-bis(dimethylphosphino)ethane]-palladium(O) | J. Chatt, et al., J. Chem. Soc., 1962, 2537 |
| 6. Bis[ortho-bis(diethylphosphino(benzene]-palladium(O) | do |
| 7. Bis[bis(diphenylphosphino)-methane]palladium(O) | do |
| 8. Bis[bis(1,2-diphenylphosphino)ethane]palladium(O) | do |
| 9. Bis[bis(ortho-dimethyl-arsino)benzene] palladium(O) | do |
| 10. Tris(triphenylphosphine)-chlororhodium(I) | J. A. Osborn, et al., J. Chem. Soc., 1966A, 1711 |
| 11. Bis(triphenylphosphine)-allenechlororhodium(I) | S. Otsuka, et al., J. Chem. Soc., 1969A, 1404 |
| 12. Tris(triphenylarsine)-chlororhodium(I) | J. T. Mague et al., J. Chem. Soc., (A), 1966, 1736 |
| 13. Bis(triphenylphosphine)-carbonylchlororhodium(I) | M. C. Baird et al., J. Chem. Soc., 1967A, 1347 |
| 14. μ-Dichlorotetraethylene-dirhodium(I) | R. Cramer, J. Org. Chem., 1, 722 (1962) |

The amount of catalyst used is not critical. A molar ratio of catalyst to allene in the range of about 1:100 to about 1:5,000 is recommended and of about 1:250 to about 1:500 is generally used and preferred, although a ratio as low as 1:40,000 has been found effective.

The process can be operated with or without an added solvent, the only restriction being that solvents which are strongly basic (e.g., amines) or strongly coordinating (e.g., phosphines or phosphites) should be avoided. The reaction has been run successfully without added solvent, and with representative solvent media such as benzene (hydrocarbons) and tetrahydrofuran (ethers).

The product mono- and bis(2,3-dimethylenebutyl)-bis(negatively substituted)methanes are generally liquid materials and can be isolated by distillation under reduced pressures. They are 3-substituted 2-methyl-1,3-butadienes (isoprenes), and accordingly are capable of vinyl polymeriza-tion, including copolymerization, by methods usually employed with dienes such as 1,3-butadiene and isoprene.

The polymers which are prepared from the monomers include both homopolymers and copolymers. The polymers of the mono- and bis(2,3-dimethylenebutyl)-bis(negatively substituted)methanes are thermoplastic solids. Polymers of the mono(2,3-dimethylenebutyl)-bis(negatively substituted)methanes are generally soluble in aromatic hydrocarbon solvents (e.g., benzene) and can be formed by solvent casting into useful, thin, tough, flexible films.

The unsaturated comonomers that may be used in these systems are limited only by the degree to which they may polymerize in the presence of free-radical initiators. These comonomers include: acrylonitrile, styrene, isoprene, butadiene, piperylene, ethylene, propylene, vinyl acetate, vinyl chloride, methyl vinyl ether, vinyl fluoride, 2-vinyl pyridine, methyl acrylate, acrolein and methyl vinyl ketone.

Polymerization of the monomers of the invention is effected by procedures generally applicable to ethylenically unsaturated (vinyl) monomers. Emulsion polymerization methods involving a persulfate polymerization initiator, as generally used with 1,3-dienes and as illustrated below, are preferred [cf., Marvel et al., J. Poly. Sci. 4 583 (1949)].

The structures of these polymers are probably best described by analogy to the nonfunctional 2,3-dialkyl and 2-alkyl butadienes. In these systems, the polymers obtained, [(C. S. Marvel, et al., loc. cit.; M. Morton and W. E. Gibbs, J. Polymer. Sci., (A), 1, 2679 (1963)] are generally mixtures of 1,2 and cis and trans 1,4-polymer units (in theory, a copolymer). The percentage of 1,2 is usually 10–15 percent, 1,4 units constituting the remainder. Structures are as follows:

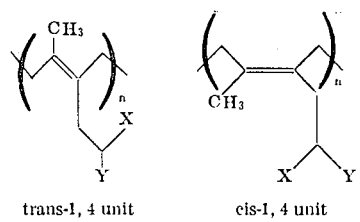

trans-1, 4 unit      cis-1, 4 unit

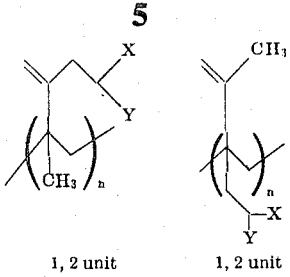

1, 2 unit      1, 2 unit where X and Y are CN, COR', or $CO_2R'$.

The polymers of the bis compounds are insoluble and highly cross-linked and serve as melt-formable construction materials.

The structures of the copolymers are similar. Thus, the above units may alternate or randomly enter a chain containing the comonomer units. The comonomer units may be described by structure A if derived from a vinylic monomer and by structures B, C, D and E if derived from a 1,3-diene.

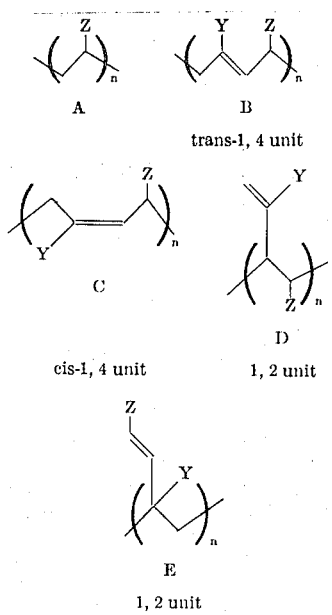

A

B trans-1, 4 unit

C

D cis-1, 4 unit      1, 2 unit

E 1, 2 unit

In these formulas, Y and Z are alkyl, aryl, halogen, hydrogen, cyano, OAc, COOR', OR' and/or CHO.

EMBODIMENTS OF THE INVENTION

The following representative examples illustrate the invention more specifically. In these examples, pressure is atmospheric unless designated in millimeters of mercury, parts and percentages are by weight, and temperature is in degrees centigrade.

EXAMPLE 1

Diethyl (2,3-Dimethylenebutyl)malonate

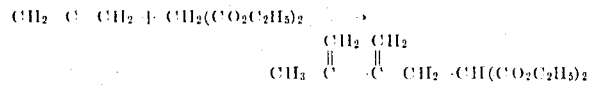

A solution of 32.2 g. (0.20 mole) of diethyl malonate and 1.46 g. (0.002 mole) of bis(triphenylphosphine)-(maleic anhydride)palladium(O) in 25 ml. of tetrahydrofuran was charged to an 80-cc. stainless steel-lined autoclave. To this system was added 8 g. (0.20 mole) of allene. The autoclave was then heated to 100° C. for 6 hours with shaking. The resulting mixture was transferred from the autoclave and distilled directly to give 20.62 g. (86 percent conversion, based on allene) of diethyl (2,3-dimethylenebutyl)malonate, b.p. 80°–81.5° C./0.18 mm.

Anal. Calcd. for $C_{13}H_{20}O_4$: C, 65.0; H, 8.4
Found: C, 64.6; H, 8.6

EXAMPLE 2

(2,3-Dimethylenebutyl)malononitrile

A solution of 13.2 g. (0.20 mole) of malononitrile, 0.71 g. (0.001 mole) of tetrakis(triphenylphosphine)palladium(O), and 0.10 g. of hydroquinone in 25 ml. of tetrahydrofuran was charged to an 80-cc. stainless steel-lined autoclave. To this system was added 8 g. (0.20 mole) of allene. The autoclave was then heated to 60° C. for 6 hours with shaking. The resulting mixture was filtered to remove a yellow powder and the filtrate distilled giving three fractions:

| Fraction | B.P. | Wt. | Composition |
|---|---|---|---|
| 1 | 65–75/0.5–0.4 mm. | 5.87 g. | 60% pure |
| 2 | 75–85/0.5–0.4 mm. | 2.32 g. | 95% pure |
| 3 | 85–90/0.5–0.4 mm. | 0.49 g. | 92% pure |

This represents a combined yield of (2,3-dimethylene-butyl)malononitrile of 47 percent. A pure sample was analyzed giving:

Anal. Calcd. for $C_9H_{10}N_2$: C, 73.9; H, 6.9
Found: C, 73.6; H, 6.9.

EXAMPLE 3

Ethyl (2,3-Dimethylenebutyl)cyanoacetate

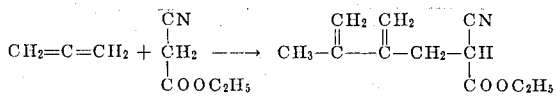

A solution of 22.6 g. (0.20 mole) of ethyl cyanoacetate and 0.364 g. (0.0005 mole) of bis(triphenylphosphine)-(maleic anhydride)palladium(O) in 25 ml. of tetrahydrofuran was charged to an 80-cc. stainless steel-lined autoclave. To this system was added 12 g. (0.30 mole) of allene. The autoclave was heated to 120° for 6 hrs. with shaking. The resulting solution was directly distilled giving 10.14 g. (40 percent yield) of ethyl (2,3-dimethylenebutyl)cyanoacetate, b.p. 68°–70.5°/0.17 mm.

Anal. Calcd. for $C_{11}H_{15}NO_2$: C, 68.3; H, 7.8: N, 7.3
Found: C, 67.8; H, 7.7; N, 6.9.

EXAMPLE 4

(2,3-Dimethylenebutyl)diacetylmethane

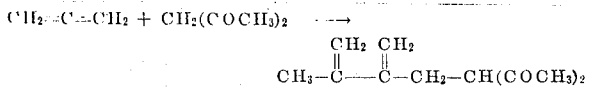

A solution of 20.6 ml. (0.20 mole) of 2,4pentanedione and 0.73 g. (0.001 mole) of bis(triphenylphosphine)-(maleic anhydride)palladium(O) in 25 ml. of tetrahydrofuran was charged to an 80-cc. stainless steel-lined autoclave. To this system was added 8 g. (0.200 mole) of allene. The system was then heated to 50° for 6 hrs. with shaking. The resulting solution was directly distilled giving 10.9 g. (60 percent yield) of (2,3-dimethylenebutyl)diacetylmethane, b.p. 60°/0.10 mm.

An ultraviolet spectrum in isooctane revealed K=34.4 at 288 mµ and K=86.8 at 244 mµ. These corresponds to E values of 6,200 and 15,650 respectively.
Anal. Calcd. for $C_{11}H_{16}O_2$: C, 73.3; H, 8.95
Found: C, 73.3; H, 8.92.

EXAMPLE 5

(2,3-Dimethylenebutyl)diacetylmethane

A solution of 20.6 ml. (0.200 mole) of 2,4-pentanedione and 0.0005 mole of tris(triphenylphosphine)chlororhodium(I) in 25 ml. of tetrahydrofuran as solvent was charged to an 80-cc. stainless steel-lined autoclave. To this system was added 8 g. (0.200 mole) of allene and the autoclave heated to 120° for 6 hrs. with shaking. The resulting solution was analyzed for (2,3-dimethylenebutyl)diacetylmethane by GLC analysis (4', 20 percent silicone gum nitrile column). A 5 percent yield of (2,3-dimethylenebutyl)diacetylmethane was obtained.

EXAMPLE 6

(2,3-Dimethylenebutyl)diacetylmethane

The procedure of Example 5 was substantially repeated except that tetrakis(triphenylphosphine)palladium(O) (0.0005 mole) was employed as catalyst and acetonitrile (25 ml.), as solvent. GLC analysis showed a 95 percent yield of (2,3-dimethyl-butyl)diacetylmethane.

EXAMPLE 7

(2,3-Dimethylenebutyl)diacetylmethane

The procedure of Examples 5 and 6 was substantially repeated except that bis(triphenylphosphine) (furmaronitrile)-palladium(O) was employed as catalyst and benzene, as solvent. GLC analysis showed a 92 percent yield of (2,3-dimethylenebutyl)-diacetylmethane.

Bis(triphenylphosphine) (fumaronitrile)palladium(O), a new compound, was prepared as follows:

A solution of 11.50 g. (10 mmole) of tetrakis(triphenylphosphine)palladium(O) was prepared in 340 ml. of benzene under nitrogen. To this was added 0.78 g. (10 mmole) of fumaronitrile in 30 ml. of benzene. Volatiles were evaporated from the resulting solution on a rotary evaporator leaving a residue which on recrystallization from methylene chloride/hexane gave 5.2 g. (75 percent yield) of bis(triphenyl-phosphine)(fumaronitrile)palladium(O), m.p. 198.5°–199°.
Anal. Calcd. for $C_{40}H_{32}PdP_2N_2$: C, 67.8 ; H, 4.55; P, 8.74
Found: C, 68.15; H, 4.64; P, 8.96

EXAMPLE 8

Ethyl (2,3-dimethylenebutyl) (acetyl)acetate

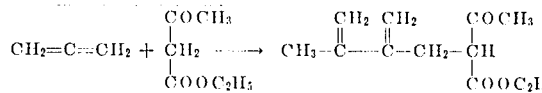

A solution of 39.3 g. (0.300 mole) of ethyl acetoacetate and 0.364 g. (0.0005 mole) of bis(triphenylphosphine)-(maleic anhydride)palladium(O) in 25 ml. of tetrahydrofuran was charged to an 80-cc. stainless steel-lined autoclave. To this was added 10 g. (0.250 mole) of allene and the charged autoclave was heated at 120° for 6 hr. with shaking. The resulting mixture was then directly distilled giving 15.26 g. (58 percent yield, based on ethyl acetoacetate) of ethyl (2,3-dimethyl-ene butyl) (acetyl)acetate, b.p. 75°–81°/0.32 mm.
Anal. Calcd. for $C_{12}H_{18}O_3$: C, 68.6; H, 8.63
Found: C, 68.8; H, 8.9.

EXAMPLE 9

Bis(2,3-dimethylenebutyl)malononitrile

A solution of 6.6 g. (0.10 mole) of malononitrile and 0.364 g. (0.0005 mole) of bis(triphenylphosphine) (maleic anhydride)palladium(O) in 25 ml. of tetrahydrofuran was charged to a 80-cc. stainless steel-lined autoclave. Allene (10 g., 0.25 mole) was charged to the system, and the autoclave was heated to 120° for 6 hr. with shaking. The content of the autoclave was transferred to a distillation assembly and distilled directly to give 10.4 g. (74 percent conversion, based on malononitrile) of bis(2,3-dimethylenebutyl)malononitrile) b.p. 98.5°–101.5°/0.15 mm.
Anal. Calcd. for $C_{15}H_{19}N_2$: C, 79.6; H, 8.0; N, 12.4
Found: C, 79.2; H, 8.0; N, 12.8.

EXAMPLE 10

Bis(2,3-dimethylenebutyl)diacetylmethane

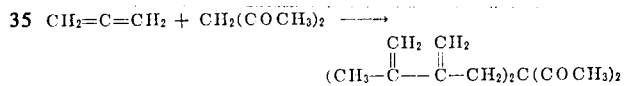

A solution of 10 g. (0.100 mole) of 2,4-penetanedione and 0.364 g. (0.0005 mole) of bis(triphenylphosphine)maleic anhydride)-palladium(O) in 25 ml. of tetrahydrofuran was charged to an 80-cc. stainless steel-lined autoclave. To this system was added 20 g. (0.500 mole) of allene, and the autoclave was heated at 120° for 6 hr. with shaking. The resulting mixture was distilled directly to give 8.6 g. (34 percent yield) of bis(2,3-dimethylenebutyl)diacetylmethane, b.p. 108°–111°/0.5 mm.
Anal. Calcd. for $C_{17}H_{24}O_2$: C, 78.45; H, 9.29
Found: C, 78.7 ; H, 9.6.

EXAMPLE 11

Ethyl Bis(2,3-dimethylenebutyl) (acetyl)acetate

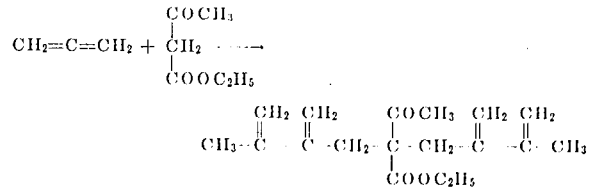

A solution of 13 ml. (0.100 mole) of ethyl acetoacetate and 0.364 g. (0.0005 mole) of bis(triphenylphosphine)-(maleic (maleic anhydride)palladium(O) in 25 ml. of tetrahydrofuran was charged to an 80-cc. stainless steel-lined autoclave. To this system was added 20 g. (0.500 mole) of allene and the autoclave was heated to 120° for 6 hrs. with shaking. The resulting solution was directly distilled, giving 10.4 g. (38 percent yield) of ethyl bis(2,3-dimethylenebutyl)(acetyl)-acetate, b.p. 101°–106.9°/0.19 mm.
Anal. Calcd. for $C_{17}H_{26}O_3$: C, 73.35; H, 9.12
Found: C, 73.9; H, 8.7

Additional substituted methanes of the invention can be obtained by reaction between allene and other appropriate precursors. A list of such is given in Table II, which follows. In this Table, when allene is reacted with the compound of column 1 under the conditions of Example 1, supra, the product(s) of column 2 is obtained.

TABLE II

| Activated Methane | Product(s) |
|---|---|
| 1. 3-Methyl-2,4-pentanedione | 3-(2,3-Dimethylenebutyl)-3-methyl-2,4-pentanedione |
| 2. 3-Ethyl-2,4-pentanedione | 3-(2,3-Dimethylenebutyl)-3-ethyl-2,4-pentanedione |
| 3. 1-Phenyl-1,3-butanedione | 2-(2,3-Dimethylenebutyl)-1-phenyl-1,3-butanedione<br>2,2-Bis(2,3-dimethylenebutyl)-1-phenyl-1,3-butanedione |
| 4. Acetylacetonitrile | (2,3-Dimethylenebutyl)(acetyl)-acetonitrile<br>Bis(2,3-dimthylenebutyl)(acetyl)-acetonitrile |
| 5. 1,3-Cyclohexanedione | 2-(2,3-Dimethylenebutyl)-1,3-cyclohexanedione<br>2,2-Bis(2,3-dimethylenebutyl)-1,3-cyclohexanedione |
| 6. Ethyl nitroacetate | Ethyl (2,3-dimethylenebutyl)nitro-acetate<br>Ethyl bis(2,3-dimethylenebutyl)-nitroacetate |
| 7. 2-Nitroacetophenone | 2-(2,3-Dimethylenebutyl)-2-nitro-acetophenone<br>2,2-Bis(2,3-dimethylenebutyl)-2-nitroacetophenone |
| 8. N,N-Dimethylacetoacetamide | N,N-Dimethyl-1-(2,3-dimethylenebutyl)acetoacetamide<br>N,N-Dimethyl-1,1-bis(2,3-dimethylenebutyl)acetoacetamide |
| 9. N,N,N',N'-Tetramethylmalonamide | N,N,N',N'-Tetramethyl(2,3-dimethylenebutyl)malonamide<br>N,N,N',N'-Tetramethylbis(2,3-di-methylenebutyl)malonamide |
| 10. N,N-Dimethylcyanoacetamide | N,N-Dimethyl(2,3-dimethylenebutyl)-cyanoacetamide<br>N,N-Dimethylbis(2,3-dimethylenebutyl)cyanoacetamide |
| 11. Bis(methylsulfinyl)methane | (2,3-Dimethylenebutyl)bis(methylsulfinyl)methane<br>Bis(2,3-dimenthylenebutyl)bis(methylsulfinyl)methane |
| 12. (Ethylsulfonyl)(phenylsulfonyl)methane | (2,3-Dimethylenebutyl)(ethylsulfonyl)(phenylsulfonyl)methane<br>Bis(2,3-Dimenthylenebutyl)(ethyl-sulfonyl)(phenylsulfonyl)methane |
| 13. 1,1-Bis(ethylsulfonyl)ethane | 1-(2,3-Dimethylenebutyl)-1,1-bis-(ethylsulfonyl)ethane |
| 14. Diethyl methylmalonate | Diethyl(2,3-dimethylenebutyl)methylmalonate |
| 15. Dimethyl ethylmalonate | Dimethyl (2,3-dimethylenebutyl)ethylmalonate |
| 16. Methylmalonitrile | (2,3-Dimethylenebutyl)methylmalono-nitrile |
| 17. Ethylmalononitrile | (2,3-Dimethylenebutyl)ethylmalono-nitrile |
| 18. Ethyl methylcyanoacetate | Ethyl (2,3-dimethylenebutyl)methylcyanoacetate |
| 19. Methyl ethylcyanoacetate | Methyl (2,3-dimethylenebutyl)ethylcyanoacetate |
| 20. Ethyl 2-acetylpropionate | Ethyl 2-(2,3-dimethylenebutyl)-2-acetylpropionate |
| 21. Ethyl 2-acetylbutyrate | Ethyl 2-(2,3-dimethylenebutyl)-2-acetylbutyrate |
| 22. Ethyl 2-nitropropionate | Ethyl 2-(2,3-dimethylenebutyl)-2-nitropropionate |
| 23. 2-Nitropropiophenone | 2-(2,3-Dimethylenebutyl)-2-nitro-propiophenone |

EXAMPLE 12

Diethyl (2,3-Dimethylenebutyl)malonate Homopolymer

A. An emulsion consisting of 5 g. of diethyl(2,3-dimethylenebutyl)malonate, 0.5 g. of Ivory soap, 0.010 g. of dodecyl mercaptan, 0.015 g. of potassium persulfate and 9 ml. of water was stirred under nitrogen at 47° for 91 hours. The resulting thick emulsion was then poured into 200 ml. of saturated salt water to give a white solid which was collected on a filter. This solid was dissolved in 100 ml. of hot benzene and the resulting solution poured into 800 ml. of methanol. A white, tacky elastomeric material precipitated. When air-dried, it weighed 2.1 g. (42 percent conversion).

Analysis: Inherent viscosity at 0.1 percent in benzene (25°), 2.67.

B. A similar polymerization of ethyl (2,3-dimethylene-butyl)cyanoacetate gave an 80 percent conversion to a polymer that was insoluble in benzene (see Table III).

EXAMPLE 13

Diethyl (2,3-Dimethylenebutyl)malonate/-Iosprene Copolymer

A mixture of 1 g. of diethyl (2,3-dimethylenebutyl)-malonate, 10 g. of isoprene, 0.5 g. of Ivory soap, 0.03 g. of potassium persulfate, 0.03 g. of dodecyl mercaptan and 18 ml. of water was placed under a nitrogen atmosphere in a 100 ml. round-bottom flask and heated to 50° for 21 hours. The resulting emulsion was then poured into 250 ml. of saturated salt water. The resulting precipitate was collected on a filter and washed with three 100-ml. portions of methanol, and the wet polymer was dried at 42° C. and ≈40 mm. pressure for 28 hours. The dry polymer weighed 3.0 g. (27 percent conversion) and possessed an inherent viscosity of 0.59 at 0.1 percent concentration in benzene (25° C.). The polymer was a colorless, tacky, gel-like solid which is useful as a temporary adhesive, e.g., on a readily strippable paper overlay.

Analysis: 0, 3.93 percent (corresponds to ≈14.6 percent incorporation of diester into polymer).

EXAMPLE 14

Diethyl (2,3-Dimethylenebutyl)malonate/-Styrene Copolymer

An emulsion consisting of 1 g. of diethyl (2,3-dimethylenebutyl)malonate, 10 g. of styrene, 0.5 g. of Ivory soap, 0.03 g. of potassium persulfate and 20 g. of water was stirred under nitrogen at 47° for 40 hours.

The resulting emulsion was poured into 250 ml. of saturated salt water and filtered. The polymer was washed with three portions (15 ml. each) of water, and similarly with methanol. It was then dried overnight at room temperature and 0.5 mm. pressure. A fine, white powder weighing 11.0 g. (100 percent conversion and yield) resulted.

An 8 percent solution of the polymer in benzene was poured onto a glass plate. After the benzene had evaporated, there remained a tough, flexible, colorless film useful, for example, as a wrapping film.

Analysis: Inherent viscosity (0.1 percent in benzene at 25° C.), 3.99.

Oxygen, 3.78 percent ($\approx$14.2 percent incorporation of ester). This oxygen analysis may be high, due to the presence of residual solvent such as water or methanol.

Similar results were obtained using other difunctional dienes as shown in Table III.

TABLE III

Polymers of compounds of formula $CH_3-\overset{\overset{CH_2}{\|}}{C}-\overset{\overset{CH_2}{\|}}{C}-CH_2-\overset{\overset{X}{|}}{C}H-Y$

| Example number | X | Y | Comonomer | Monomer: comonomer (charge ratio by weight) | Inherent viscosity* | Elemental analysis, percent | |
|---|---|---|---|---|---|---|---|
| | | | | | | O | N |
| 15 | CN | $CO_2C_2H_5$ | None | | Insoluble | | |
| 16 | $CO_2C_2H_5$ | $CO_2C_2H_5$ | Isoprene | 10:1 | 3.35 | 3.57 | |
| 17 | CN | $CO_2C_2H_5$ | Styrene | 20:1 | 1.76 | 1.66 | 0.41 |
| 18 | CN | $CO_2C_2H_5$ | Isoprene | 10:1 | Insoluble | | 0.66 |

*At 0.1% concentration in benzene at 25° C.

UTILITY

The monomers of the invention are useful as solvents and plasticizers. They are obviously also useful as intermediates in the preparation of polymers and copolymers which can be fabricated into useful films and molded articles. The polymers are also useful as adhesives and pigment carriers. Copolymers containing the monomers of the invention along with standard monomers (e.g., styrene or isoprene) possess improved drying properties and oil resistance.

The polymers are characterized by the general utilities associated with elastomers. This is especially true of the copolymers with isoprene and butadiene, particularly the copolymers of either (2,3-dimethylenebutyl)malono-nitrile or ethyl (2,3-dimethylenebutyl)cyanoacetate with isoprene or butadiene. The incorporation of cyano-groupings imparts a degree of oil resistance to the resulting elastomers (see Example 18). Thus the polymers find use as tire treads, belting, hose, unvulcanized sheet, flooring and shoe soles.

The monomers of this invention have also been shown to react with maleic anhydride in a Diels-Alder reaction to form 4,5-disubstituted cyclohex-4-ene-1,2-dicarboxylic acid anhydrides, which are intermediates to polyester resins of the type preparable from maleic anhydride. An equation for the Diels-Alder reaction is:

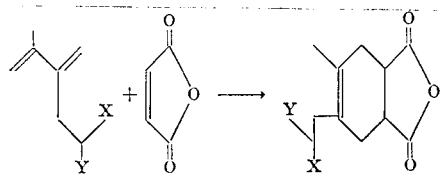

An example of this reaction and use of the product to form a polyester resin is as follows:

EXAMPLE A

Part I

A solution of maleic anhydride (2.16 g., 22 mmole) in 15 ml. of benzene was added to a solution of bis(2,3-di-methylenebutyl)malononitrile (2.27 g., 10 mmole) in 5 ml. of benzene over 45 min. with stirring. The solution was allowed to stand over night giving a white crystalline mass. This was filtered directly giving a white powder, 3.93 g., after washing three times, each with 15 ml. of benzene. This powder could not be properly recrystallized but could be precipitated from methylene chloride by addition of ether. A white powder, weight 1.95 g., m.p. 217°–218°, resulted.

The formation of two steroisomers is possible here and could account for the amorphous character of the product. The product is assigned the structure 4-(2',2'-dicyanoethyl-5-methylcyclohex-4-ene-1,2-dicarboxylic acid anhydride on the following basis:

Anal. Calcd. for $C_{23}H_{22}N_2O_6$: C, 65.4; H, 5.25; N, 6.63
Found: C, 65.92; H, 5.09; N, 6.47
NMR (60 MHz, dimethyl sulfoxide): 8.22$\tau$, s, 6H; 6.4–7.9 $\tau$, m, 16H. Infrared: 1,775 cm$^{-1}$, 1,840 cm$^{-1}$ (anhydride bands).

Part II

A mixture of 24.3 parts by weight of glycerol, 30.9 parts of stearic acid, 69.1 parts of 4-(2', 2'-dicyanoethyl)-ethyl)-5-methylcyclohex-4-ene-1,2-dicarboxylic acid anhydride and 20.0 parts of mineral spirits is heated at reflux. The refluxing mixture of mineral spirits and water is separated, the mineral spirits being returned to the reaction and the water discarded. After 4 hours of heating in this manner, an additional 30.0 parts of mineral spirits is added. Heating and water removal are continued for an additional 56 hours with gradual addition of mineral spirits until the solution contains 40 percent solids. The resulting resin solution is cooled, and there is then added a solution of 0.62 part of cobalt linoleate in sufficient mineral spirits to bring the solids content to 29 percent. The resulting clear varnish is brushed onto a wood surface. It dries in air within 4 hours to yield a clear, tough, durable, protective coating.

Since obvious modifications and equivalents in the invention will be evident to those skilled in the chemical arts, I propose to be bound solely by the appended claims.

The embodiments of the invention in which an exclusive property or privilege is claimed are defined as follows:

1. A compound of the formula

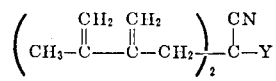

wherein
  Y is cyano (—CN), hydrocarbylcarbonyl (—COR), hydrocarbyloxycarbonyl (—COOR), nitro (—NO$_2$), N,N-dihydrocarbylamido (—CONR$_2$), hydrocarbylsulfinyl (—SOR), the hydrocarbyl group R being lower alkyl of up to eight carbons or aryl of six to 10 carbons.

2. The compound of claim 1 named bis(2,3-dimethylene-butyl)malononitrile.

3. The process which comprises reacting, at a temperature of about 50°–150° C.,
  allene
  with
  a negatively disubstituted methane of the formula NC—CHR''—Y, wherein R'' is hydrogen or lower alkyl and Y is as defined in claim 1,
  in the presence of
  a palladium(O) or rhodium(I) complex catalyst.

4. The process of claim 3 wherein the catalyst complex is selected from the group consisting of
  bis(triphenylphosphine)(maleic anhydride)palladium(O)
  tetrakis(triphenylphosphine)palladium(O)
  tris(triphenylphosphine)chlorohodium(I), and
  bis(triphenylphosphine)(fumaronitrile)palladium(O).

5. The process of claim 4 wherein the catalyst is bis(triphenylphosphine)(maleic anhydride)palladium(O).

6. The process of claim 4 wherein the methane is malononitrile.

* * * * *